United States Patent
Eickemeyer et al.

(10) Patent No.: US 11,847,458 B2
(45) Date of Patent: Dec. 19, 2023

(54) THREAD PRIORITIES USING MISPREDICTION RATE AND SPECULATIVE DEPTH

(71) Applicant: International Business Machines Corporation, Armonk, NY (US)

(72) Inventors: Richard J. Eickemeyer, Rochester, MN (US); Ehsan Fatehi, Edinburg, TX (US); John B. Griswell, Jr., Austin, TX (US); Naga P. Gorti, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/366,244

(22) Filed: Jul. 2, 2021

(65) Prior Publication Data

US 2023/0004394 A1   Jan. 5, 2023

(51) Int. Cl.
*G06F 9/38* (2018.01)

(52) U.S. Cl.
CPC .......... *G06F 9/3804* (2013.01); *G06F 9/3842* (2013.01); *G06F 9/3851* (2013.01); *G06F 9/3844* (2013.01)

(58) Field of Classification Search
CPC .... G06F 9/3842; G06F 9/3851; G06F 9/3861; G06F 9/3804; G06F 9/3806; G06F 9/3888
See application file for complete search history.

(56) References Cited

U.S. PATENT DOCUMENTS

| | | | | |
|---|---|---|---|---|
| 6,073,159 A * | 6/2000 | Emer | ............. | G06F 9/3851 |
| | | | | 712/E9.06 |
| 7,890,738 B2 | 2/2011 | Eisen et al. | | |
| 9,086,721 B2 | 7/2015 | Jackson et al. | | |
| 2001/0056456 A1* | 12/2001 | Cota-Robles | ......... | G06F 9/4843 |
| | | | | 718/103 |
| 2009/0193231 A1* | 7/2009 | Gschwind | ............. | G06F 9/3861 |
| | | | | 712/205 |
| 2009/0193240 A1* | 7/2009 | Gschwind | ............. | G06F 9/3851 |
| | | | | 712/E9.016 |
| 2014/0201508 A1* | 7/2014 | Busaba | ............... | G06F 9/38 |
| | | | | 712/239 |
| 2017/0249149 A1* | 8/2017 | Priyadarshi | ........... | G06F 9/3836 |
| 2019/0004803 A1* | 1/2019 | Al Sheikh | ............. | G06F 9/3806 |

(Continued)

OTHER PUBLICATIONS

Luo et al. "Boosting SMT Performance by Speculation Control," Proceedings of the 15th International Parallel and Distributed Processing Symposium (IPDPS 2001) IEEE, 2000, 8 pages.

(Continued)

*Primary Examiner* — Courtney P Carmichael-Moody
(74) *Attorney, Agent, or Firm* — Scully, Scott, Murphy & Presser, P.C.

(57) ABSTRACT

Methods and systems for determining a priority of a threads is described. A processor can execute branch instructions of the thread. The processor can predict branch instruction outcomes of the branch instructions of the thread. The processor can increment a misprediction count of the thread in response to an actual execution of a branch instruction of the thread being different from a corresponding branch instruction prediction outcome of the thread. The processor can determine the priority of the thread based on the misprediction count of the thread.

11 Claims, 7 Drawing Sheets

(56) References Cited

U.S. PATENT DOCUMENTS

2019/0303163 A1* 10/2019 Aboud .............. G06F 9/30058
2020/0401409 A1* 12/2020 Dundas .............. H04L 9/0643

OTHER PUBLICATIONS

Abeydeera, W. "Optimizing Throughput Architectures for Speculative Parallelism," Massachusetts Institute of Technology, Jun. 2017, 62 pages.

Kang et al. "Speculation Control for Simultaneous Multithreading," Proceedings of the 18th International Parallel and Distributed Processing Symposium (IPDPS'04), IEEE Computer Society, 2004, 10 pages.

* cited by examiner

THREAD PRIORITIES USING MISPREDICTION RATE AND SPECULATIVE DEPTH

BACKGROUND

The present invention relates to executions in a processor and more specifically to determining thread priorities using misprediction rate and speculative depth.

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction, i.e., several instructions are overlapped in execution. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

A sequence of instructions can sometimes be referred to as a thread. A processor core, or multiple processor cores, can perform multithreading—such as executing multiple threads or instructions streams concurrently. In multithreading, the threads may be independent from one another, and may share various resources of the processor core or the multiple processor cores. Multithreading may be used in conjunction with pipelining to increase processing speed. Multithreading can allow instructions from one thread to be processed through a pipeline in response to another thread not being able to be processed for various reasons (e.g., a cache miss resulting in a required data for executing a particular instruction is not immediately available). Thus, the situation where all instructions are held up in response to a particular instruction not being able to be executed can be avoided by executing multithreading. In an example, processors configured to perform multithreading can be referred to as simultaneous multithreading (SMT) processors.

SUMMARY

The summary of the disclosure is given to aid understanding of the computer processing systems and methods of classifying branch instructions, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

In an example, a processor configured to determine a priority of a thread is generally described. The processor can include a processor pipeline including one or more execution units configured to execute branch instructions of a thread. The processor can further include a branch predictor associated with the processor pipeline and configured to predict branch instruction outcomes of the branch instructions of the thread. The processor can further include a misprediction counter configured to increment a misprediction count of the thread in response to an actual execution of a branch instruction of the thread being different from a corresponding branch instruction prediction outcome of the thread. The processor can further include an instruction fetch unit configured to determine a priority of the thread based on the misprediction count of the thread.

In an example, a computer system configured to determine a priority of a thread is generally described. The computing system can include a memory and a processor. The processor can include a processor pipeline including one or more execution units configured to execute branch instructions of a thread. The processor can further include a branch predictor associated with the processor pipeline and configured to predict branch instruction outcomes of the branch instructions of the thread. The processor can further include a misprediction counter configured to increment a misprediction count of the thread in response to an actual execution of a branch instruction of the thread being different from a corresponding branch instruction prediction outcome of the thread. The processor can further include an instruction fetch unit configured to determine a priority of the thread based on the misprediction count of the thread.

In an example, a method for determining a priority of a thread is generally described. The method can include executing, by a processor, branch instructions of the thread. The method can further include predicting, by the processor, branch instruction outcomes of the branch instructions of the thread. The method can further include incrementing, by the processor, a misprediction count of the thread in response to an actual execution of a branch instruction of the thread being different from a corresponding branch instruction prediction outcome of the thread. The method can further include determining, by the processor, the priority of the thread based on the misprediction count of the thread.

Further features as well as the structure and operation of various embodiments are described in detail below with reference to the accompanying drawings. In the drawings, like reference numbers indicate identical or functionally similar elements.

DETAILED DESCRIPTION

The following description is made for illustrating the general principles of the invention and is not meant to limit the inventive concepts claimed herein. In the following detailed description, numerous details are set forth in order to provide an understanding of a processor, its architectural structure, and its method of operation, however, it will be understood by those skilled in the art that different and numerous embodiments of the processor, architectural structure, and method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The term "workload" of a processor refers to the number of instructions being executed by the processor during a given period or at a particular instant of time.

Figure 1:
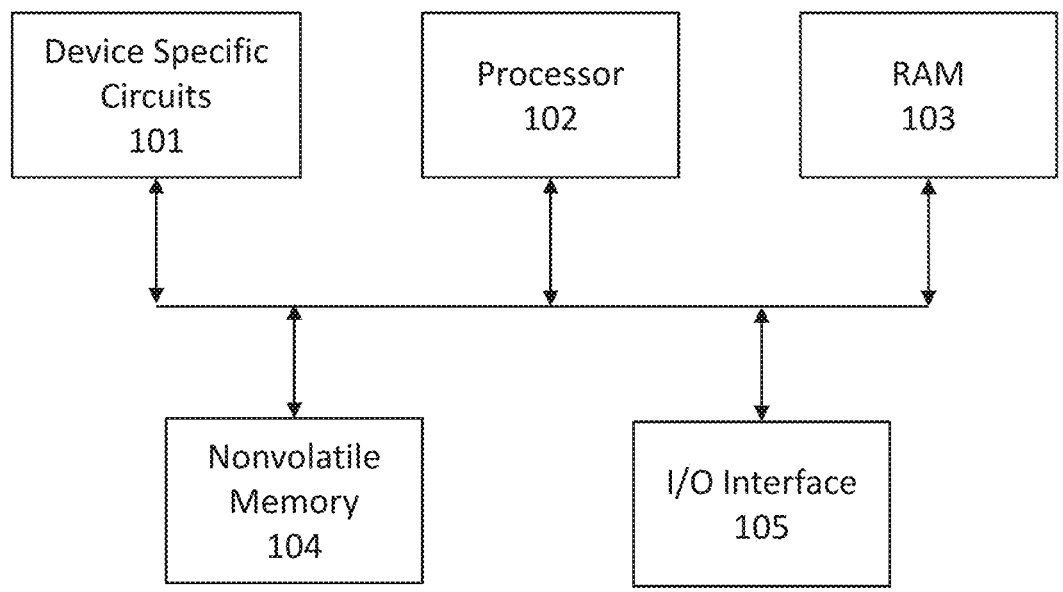
FIG. 1 depicts a general computing or data processing system in accordance with an embodiment.

A computing or data processing system 100 suitable for storing and/or executing program code may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
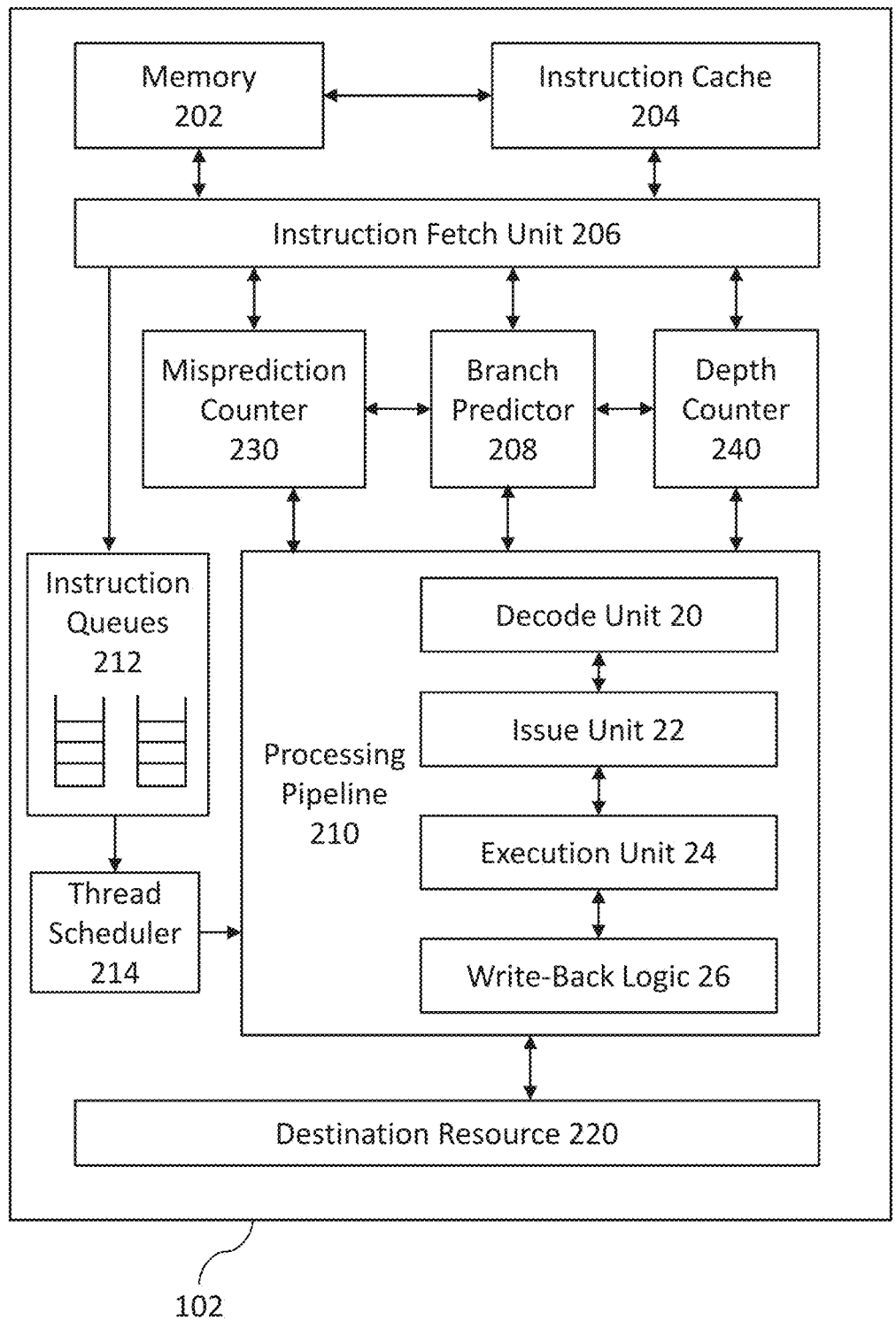
FIG. 2 a block diagram of a processor in accordance with an embodiment

FIG. 2 depicts a block diagram of a processor 102 according to an embodiment. The processor 102 may include at least a memory 202, an instruction cache 204, an instruction fetch unit 206, a branch predictor 208, and a processor pipeline or a processing pipeline 210. The processor 102 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 102. In one embodiment, instruction cache 204 may be configured to provide instructions in an 8-way set associative structure. Alternatively, any other desired configuration and size may be employed. For example, instruction cache 204 may be implemented as a fully associative, set associative, or direct mapped configuration.

In FIG. 2, a simplified example of the instruction fetch unit 206 and the processing pipeline 210 are depicted. In various embodiments, the processor 102 may include multiple processing pipelines 210 and instruction fetch units 206. In an embodiment, the processing pipeline 210 includes a decode unit 20, an issue unit 22, an execution unit 24, and write-back logic 26. In an example, the instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 102 is depicted in FIG. 2, other feedback and signaling paths may be included between elements of the processor 102.

Branch instructions (or "branch") can be either unconditional, meaning that the branch is taken every time that the instruction is encountered in the program, or conditional, meaning that the branch is either taken or not taken, depending upon a condition. The processor 102 can provide conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Most often, the instructions to be executed following a conditional branch are not known with certainty until the condition upon which the branch depends has been resolved. The branch predictor 208 can attempt to predict the outcome of conditional branch instructions in a program before the branch instruction is executed. If a branch is mispredicted, all of the speculative work, beyond the point in the program where the branch is encountered, must be discarded. For example, when a conditional branch instruction is encountered, the processor 102 may predict which instruction will be executed after the outcome of the branch condition is known. Then, instead of stalling the processing pipeline 210 when the conditional branch instruction is issued, the processor may continue issuing instructions beginning with the predicted next instruction.

In a conditional branch, control can be transferred to the target address depending upon the results of a previous instruction. Conditional branches may be either resolved or unresolved branches depending on whether the result of the previous instruction is known at the time of the execution of the branch. If the branch is resolved, then it is known whether the branch is to be executed. If the conditional branch is not executed, the next sequential instruction stream immediately following the branch instruction is executed. If the conditional branch is executed, then the instruction stream starting at the target address is executed.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions and determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch can be discarded from the various units of processor 102. The execution unit 24 may include a plurality of execution units, such as fixed-point execution units, floating-point execution units, load/store execution units, and vector multimedia execution units. The execution unit 24 may also include specialized branch predictors to predict the target of a multi-target branch. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

In an embodiment, processor 102 may perform branch prediction in order to speculatively fetch instructions subsequent to conditional branch instructions. Branch predictor 208 is included to perform such branch prediction operations. In an embodiment, instruction cache 204 may provide to the branch predictor 208 an indication of the instruction address being fetched, so that branch predictor 208 may determine which branch target addresses to select for forming a branch prediction. The branch predictor 208 may be coupled to various parts of the processing pipeline 210, such as, for example, execution unit 24, decode unit 20, reorder buffer, etc. to determine if the predicted branch direction is correct or incorrect.

To facilitate multithreading, instructions from different threads can be interleaved in some fashion at some point in the overall processor pipeline. An example technique to interleave instructions from different threads involves interleaving instructions on a cycle-by-cycle basis based on interleaving rules. For example, instructions from the different threads can be interleaved such that a processor can perform an instruction from a first thread in a first clock cycle, and then an instruction from a second thread in a second clock cycle, and subsequently another instruction from the first thread in a third clock cycle and so forth. Some interleaving techniques may involve assigning a priority to each thread and then interleaving instructions from the different threads based on the assigned priorities. For example, if a first thread is assigned to a higher priority than a second thread, an interleaving rule may require that twice as many instructions from the first thread assigned with the higher priority be included in the interleaved stream as compared to instructions from the second thread assigned with the lower priority. Various different interleaving rules can be set, such as rules designed for resolving threads with the same priority, or rules that interleave instructions from relatively less important threads periodically (e.g., performing instruction from a lower priority thread every X cycles).

Thread interleaving based on priorities can allow processor resources to be allotted based on the assigned priorities. However, thread priorities sometimes do not take into account processor events, such as branch mispredictions, that may affect the ability of threads to advance through a processor pipeline. These event can sometimes impact the efficiency of processor resources allotted between different instruction threads in a multi-thread processor. For example, priority based techniques that give higher priority to threads with fewer instructions in the decode, rename, and instruction queue stages of the pipeline sometimes can be inefficient at reducing the number of wrong-path instructions caused by branch mispredictions (e.g., incorrectly speculated instructions) in the pipeline. These wrong-path instructions can tie up the fetch bandwidth and other valuable resources of the processor, such as instruction queues and other functional units.

Efficiency and/or performance of the processor 102 can be improved by reducing the number of wrong-path instructions in the processing pipeline 210. For example, threads with higher rate of mispredictions can be delayed (e.g., fetched slower by the instruction fetch unit) in the processing pipeline 210, causing a reduction in the number of wrong-path instructions in the processing pipeline 210. Further, a number of instructions following a first unfinished or unresolved branch instruction processing pipeline 210 can be tracked to prevent an excessive number of potentially wrong-path instructions being performed.

In an embodiment, the processor 102 can be a SMT processor configured to perform multithreading. The processor 102 can use one or more instruction queues 212 to collect instructions from the one or more different threads. The instruction fetch unit 206 can fetch instructions stored in the instruction cache 204 and fill the instruction queues 212 with the fetched instructions. Performance of the processor 102 can depend on how the instruction fetch unit 206 fill these instruction queues 212. The instruction fetch unit 206 can be configured to assign and manage priorities of the different threads, and based on these priorities, decide which instructions and/or which threads to fetch and send these fetched instructions to the instruction queues 212. The processor 102 can further include a thread scheduler 214 configured to schedule and distribute the instructions in the instruction queues 212 to the processing pipeline 210.

In an embodiment, the processor 102 may include a misprediction counter 230 and a depth counter 240. The misprediction counter 230 can be configured to maintain or record a misprediction count that represents a number of branch mispredictions of one or more threads. The depth counter 240 can be configured to maintain a speculative depth count that represents a speculative depth of one or more threads. The speculative depth can be a parameter representing a number of instructions that have not been executed to completion (e.g., that are predicted to be taken or not taken via the branch predictor 208, and the real branch path is unknown at the time) following a first unfinished branch in the processing pipeline 210. The processor 102, or the instruction fetch unit 206, can use the misprediction count being outputted from the misprediction counter 230, and the speculative depth count being outputted from the depth counter 240, to assign and/or modify priorities assigned to one or more threads. In an example, the misprediction counter 230 and the depth counter 240 can be implemented as individual modules in the processing pipeline 210, or can be implemented by, for example, in one of the stages implemented by the instruction fetch unit 206, the branch prediction unit 208, the decode stage, or other stages in the processing pipeline 210.

Figure 3:
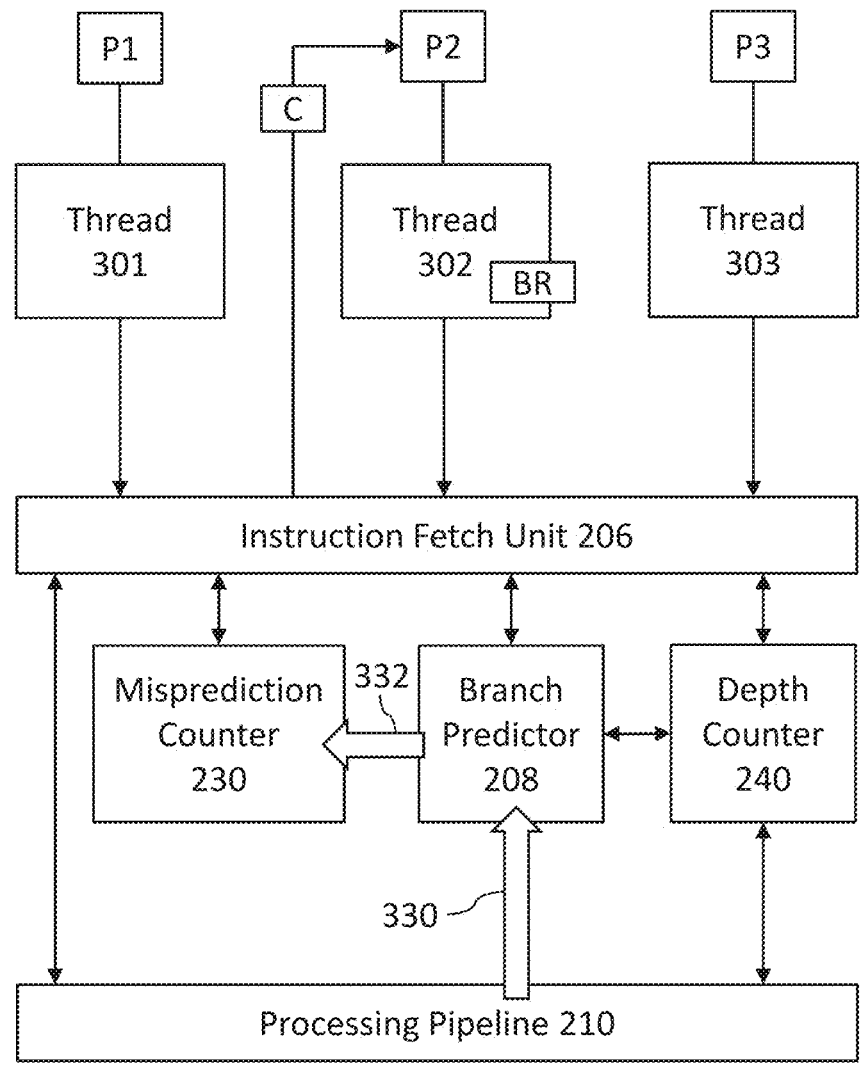
FIG. 3 illustrates an example implementation of a misprediction counter in accordance with an embodiment.

FIG. 3 illustrates an example implementation of a misprediction counter in accordance with an embodiment. In the example shown in FIG. 3, instructions from a plurality of threads, such as threads 301, 302, and 303, can be fetched by the instruction fetch unit 206 for processing in the processing pipeline 210. The instruction fetch unit 206 can be configured to maintain and manage a priority parameter ("priority") of the threads 301, 302, 303. In the example shown in FIG. 3, the priorities of the threads 301, 302, 303 are denote as P1, P2, P3, respectively. The instruction fetch unit 206 can fetch instructions from the threads 301, 302, 303 based on the priorities P1, P2, P3, and the fetched instructions can be interleaved into the processing pipeline 210 (e.g., by the thread scheduler 214 shown in FIG. 2). In an example, the instruction fetch unit 206 can prioritize fetching instructions from threads that have higher priority. Although the example shown in FIG. 3 includes three threads, it will be apparent to a person or ordinary skill in the art that the methods and systems described herein can be applied to any number of threads being execute by a processor.

The branch predictor 208 can predict branch instruction outcomes of branch instructions among the threads 301, 302, 303. For branch instructions that are fetched for processing in the processing pipeline 210, actual execution of these fetched branch instructions can be the same or different from their corresponding branch instruction prediction outcome predicted by the branch predictor 208. A correct prediction of a branch instruction by the branch predictor 208 can result in an actual execution of the branch instruction being the same as a prediction by the branch predictor 208. An incorrect prediction, or a misprediction, of a branch instruction by the branch predictor 208 can result in an actual execution of the branch instruction being different from the prediction by the branch predictor 208.

In an embodiment, a variety of suitable branch prediction algorithms may be employed by the branch predictor 208. The branch predictor 208 may include any combination of primary branch prediction structures or circuits, such as a branch target buffer (BTB) or a branch target address cache (BTAC), a branch history table (BHT), one or more pattern history tables (PHT), or the like. The BTB may be set associative and include multiple sets (columns) of BTB entries and each BTB entry may include, for example, a branch address tag and a predicted target address. The BTB may also be direct mapped or fully associative. The BTB may be a global buffer that records the outcome of every branch that executes, or it may be a per-branch buffer that records only the past history of the same branch. The BHT may hold branch history information that indicates whether a branch is predicted as taken or not taken. The BHT can also include prediction strength indicators for BHT direction predictions (e.g., strong not taken, weak not taken, weak taken, and strong taken). The BHT may be indexed based on an instruction address. A PHT may hold prediction strength indicators for direction predictions and tags associated with branch prediction patterns. To predict a branch in existing branch prediction hardware, the branch instruction's address is combined with the current value of the branch history. This can be a global branch history of the last k branch outcomes (such as a PHT) or a table that has a per-branch history, i.e. the last k outcomes of the same branch (such as a BHT). The resulting value is used to index into a predictor table in order to read off the prediction. After the branch actually executes, the outcome of the branch is shifted into the BTB.

The branch predictor 208 can be configured to detect occurrences of correct and incorrect branch predictions of one or more different threads. In an example shown in FIG. 3, upon an actual execution of a branch instruction BR of the thread 302 in the processing pipeline 210, a result 330 of the execution of BR can be provided to the branch predictor 208. The branch predictor 208 can use the result 330 to determine whether there is an occurrence of a correct or an incorrect branch prediction of BR. In response to the branch predictor 208 determining an occurrence of an incorrect branch prediction of BR, the branch predictor 208 may send misprediction data 332 to the misprediction counter 230. The misprediction data 332 can include, for example, an identifier of the thread 302 and an indicator that indicates the occurrence of the misprediction or incorrect prediction of BR. In response to the branch predictor 208 determining an occurrence of a correct branch prediction of BR, the branch predictor 208 may not need to send the misprediction data 332 to the misprediction counter 230.

The misprediction counter 230 can maintain a misprediction count for each one of the threads 301, 302, 303. In the example shown in FIG. 3, in response to receiving the misprediction data 332 indicating an occurrence of misprediction of BR, the misprediction counter 230 can increment a misprediction count of the thread 302. In an embodiment, the misprediction counter 230 can be further configured to determine a rate of misprediction of the threads 301, 302, and 303. For example, the misprediction counter 230 can determine a number of misprediction counts per one thousand instructions. The misprediction counter 230 can compare the rate of misprediction of the threads 301, 302, and 303 with a misprediction threshold. In an example, a misprediction threshold can be set to, for example, five misprediction counts per one thousand instructions.

Using the thread 302 as an example, for every one thousand instructions of the thread 302 being performed in the processing pipeline 210, the misprediction counter 230 can compare the misprediction count of the thread 302 with the misprediction threshold. If the misprediction count of the thread 302 is less than or equal to the misprediction threshold (e.g., less than or equal to five misprediction counts out of the one thousand instructions), the misprediction counter 230 can notify the instruction fetch unit 206 to add an amount of priority credit (denoted as C) to the priority P2 of the thread 302. The addition of C to P2 can increase the priority P2 of the thread 302. Note that the misprediction threshold and the value of C can be arbitrary and can be programmable dependent on a desired implementation of the system 100. For example, to reduce a frequency of adjusting the priorities of threads using the misprediction counts, the misprediction threshold can be set to a higher value. By allowing the instruction fetch unit 206 to adjust priorities of threads using misprediction counts and misprediction rates determined by the misprediction counter 230, threads that may have mispredictions less frequently can be prioritized over threads that may have mispredictions more frequently.

Figure 4:
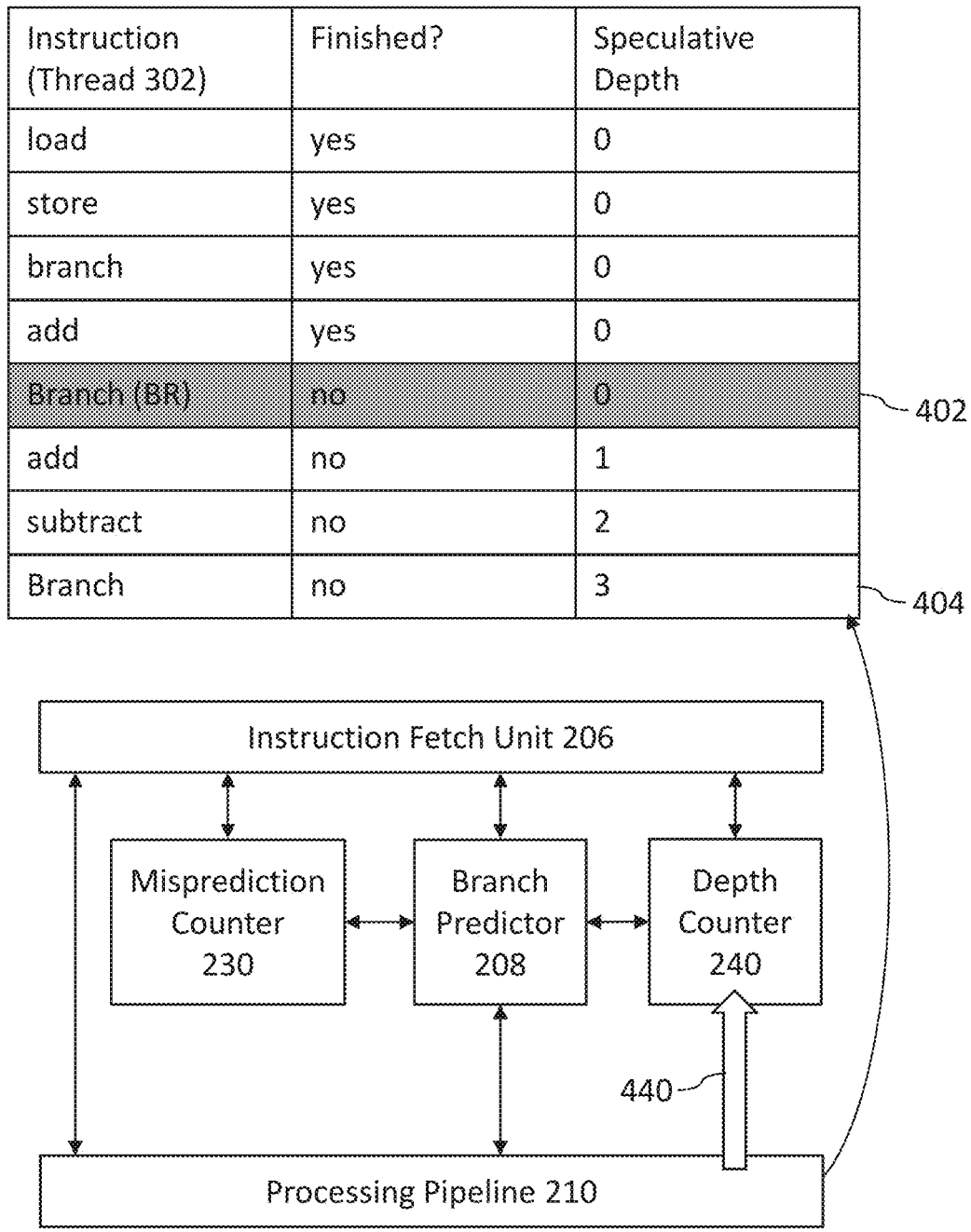
FIG. 4 illustrates an example implementation of a depth counter in accordance with an embodiment.

FIG. 4 illustrates an example implementation of a depth counter in accordance with an embodiment. In an embodiment, in addition to using the misprediction count for adjusting priorities of threads, the instruction fetch unit 206 can further use outputs from the depth counter 240 to adjust priorities of threads. The depth counter 240 can maintain a speculative depth count for one or more different threads, such as the threads 301, 302, 303 shown in FIG. 3. The speculative depth count can indicate a speculative depth of a thread. By way of example, speculative depth can be defined as a number of instructions that have not been executed to completion (e.g., that are predicted to be taken or not taken via the branch predictor 208, and the real branch path is unknown at the time) following a first unfinished branch in the processing pipeline 210.

In an example shown in FIG. 4, the depth counter 240 can receive speculative data 440 from the processing pipeline 210, where the speculative data 440 can indicate a detection of a first unfinished or unresolved branch instruction of a thread in the processing pipeline 210. The speculative depth data 440 can include, for example, an identifier of the thread having the first unfinished branch instruction and an indication of the cycle in which the detection of the first unfinished branch instruction occurred. For example, in the example shown in FIG. 4, the speculative data 440 can indicate that the branch instruction BR of the thread 302 occurred at a cycle 402. The depth counter 240 can receive the speculative data 440 and can use the speculative data 440 to determine a speculative depth of the thread 302. For example, the depth counter 240 can record and count a number of instructions of the thread 302 that have not been executed to completion following the cycle 402 (e.g., cycle where the unfinished branch instruction BR of the thread 302 occurred) in the processing pipeline 210. In the example shown in FIG. 4, the speculative depth count can be up to a value of "3" at a cycle 404.

In an embodiment, for every cycle subsequent to the cycle 402 where the first unfinished branch BR occurred, the depth counter 240 can notify the instruction fetch unit 206 to add the priority credit C to the priority P2 of the thread 302 (shown in FIG. 3). In another embodiment, the depth counter 240 can notify the instruction fetch unit 206 to add the priority credit C to the priority P2 of the thread 302, for every cycle subsequent to the cycle 402, in response to the misprediction rate of the thread 302 being less than the misprediction threshold. For example, at the cycle 404, if the misprediction rate of the thread 302 is less than the misprediction threshold, the priority of the thread 302 can be P2+3C at the cycle 404 since the priority credit C was added to P2 three times. Further, at each cycle, the depth counter 240 can compare the speculative depth count of the thread 302 with a speculative depth threshold. If the speculative depth count of the thread 302 is less than or equal to the speculative depth threshold, the depth counter 240 can continue to notify the instruction fetch unit 206 to add the priority credit C at each cycle. However, if the speculative depth count of the thread 302 is greater than the speculative depth threshold, the depth counter 240 can notify the instruction fetch unit 206 to stop adding the priority credit C. Note that the speculative depth threshold can be arbitrary and can be programmable dependent on a desired implementation of the system 100.

Figure 5:
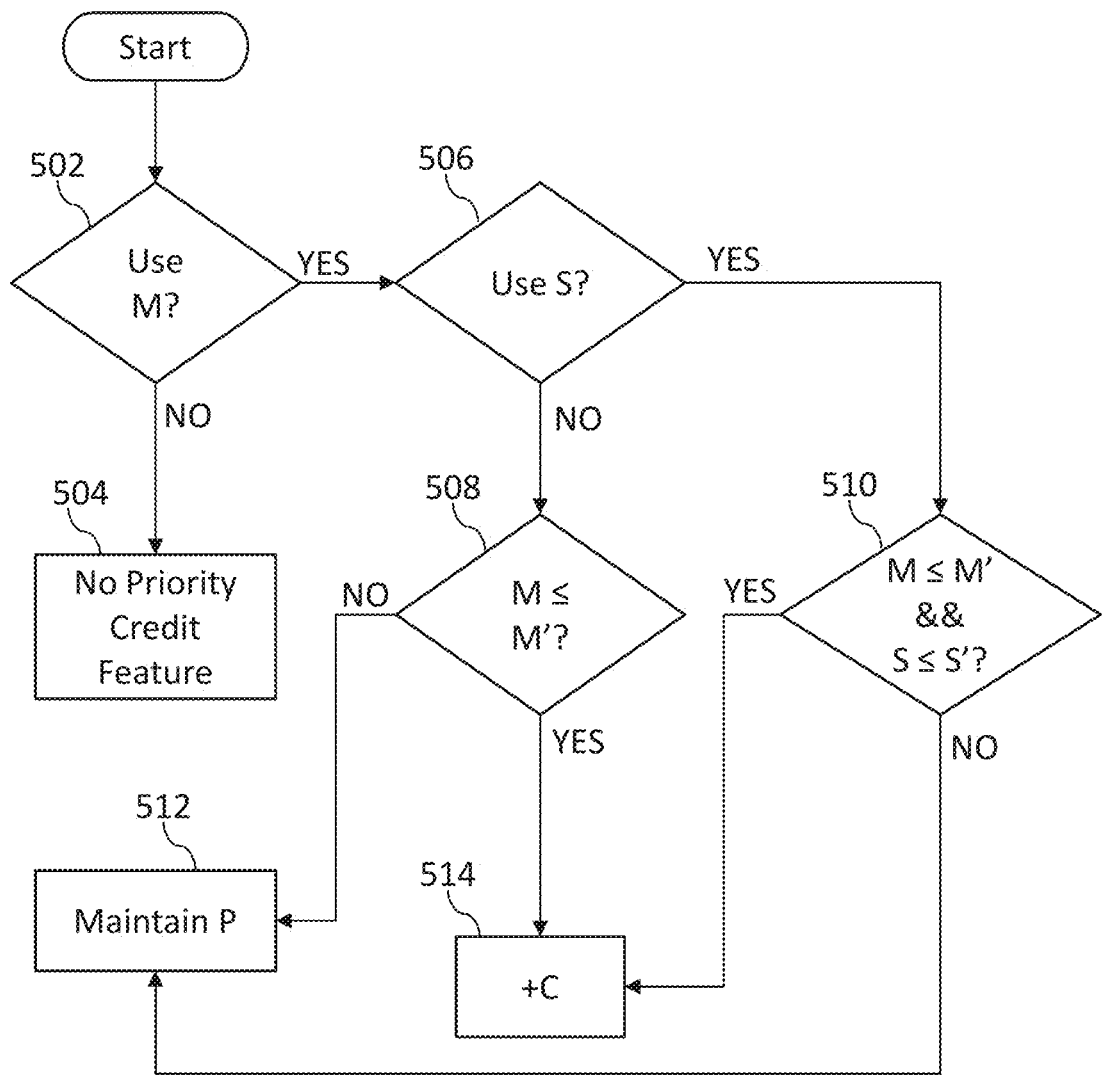
FIG. 5 illustrates an example flowchart example of determining thread priorities using misprediction rate and speculative depth in an embodiment.

FIG. 5 illustrates an example flowchart example of determining thread priorities using misprediction rate and/or speculative depth in an embodiment. The process 500 can include one or more operations, actions, or functions as illustrated by one or more of blocks 502, 504, 506, 508, 510, 512, and/or 514. Although illustrated as discrete blocks, various blocks can be divided into additional blocks, combined into fewer blocks, eliminated, or performed in parallel, depending on the desired implementation.

An example process 500 shown in FIG. 5 can be executed by the processor 102 to use at least one or both of the outputs from the misprediction counter 230 and the depth counter 240 to adjust priorities of threads. The process 500 can begin at block 502, where the processor 102 can be programmed to either use a priority credit feature or not. The priority credit feature can be a feature for the instruction fetch unit 206 to adjust priorities of threads using the misprediction count, denoted as M in FIG. 5. The misprediction count M can be a count of mispredictions per a certain amount (e.g., one thousand, or other arbitrary number) of instructions. If the processor 102 is not programmed to use the priority credit feature, the process 500 can proceed to block 504. At block 504, the processor 102 can operate under its usual operation mode without the priority credit feature.

If the processor 102 is programmed to use the priority credit feature, the process 500 can proceed to block 506. At block 506, the processor 102 can activate the misprediction counter 230. The processor 102 can be further programmed to either use the speculative depth, denoted as S in FIG. 5, in addition to using M, or not to use S in addition to M (e.g., use M only). If the processor 102 is not programmed to use S in addition to M, the process 500 can proceed to block 508.

At block 508, the processor 102 can determine a value of M for a thread, and can compare M to a misprediction threshold denoted as M' in FIG. 5. In response to M not being less than or equal to M' (or being greater than M'), the process 500 can proceed to block 512. At block 512, the priority, denoted as P, of the thread can be maintained. In response to M being less than or equal to M', the process 500 can proceed to block 514. At block 514, the processor 102 or the instruction fetch unit 206 can add a priority credit C to the priority P to increase a priority of the thread.

If the processor 102 is programmed to use S in addition to M, the process 500 can proceed to block 510. At block 510, the processor 102 can determine M for the thread, and also S of the thread. The processor 102 can compare M to M', and can compare S to a speculative depth threshold S'. In response to M not being less than or equal to M' (or being greater than M') and S not being less than or equal to S', the process 500 can proceed to block 512. In response to M being less than or equal to M' and S being less than or equal to S', the process 500 can proceed to block 514. The block 510 can be performed for every cycle subsequent to a cycle where a first unfinished branch instruction occurred, until S becomes greater than S'.

In an embodiment, at block 510, if M'=5 and S'=30, then the system 100 may allow a thread with a relatively low rate of misprediction (e.g., less than five mispredictions per one thousand instructions) to have relatively deeper speculations (e.g., up to thirty instruction speculations subsequent to a first unfinished branch instruction allowed) in the processing pipeline 210. In another embodiment, at block 510, if M'=15 and S'=10, then the system 100 may allow a thread to have a relatively high rate of misprediction (e.g., up to ten mispredictions per one thousand instructions) but may not allow the thread to have too many instruction speculations (e.g., up to ten instruction speculations subsequent to a first unfinished branch instruction allowed) in the processing pipeline 210. In another example, in response to an increase of M', S' can be decreased to prevent a thread from having excessive mispredictions and large speculative depth at the same time. Further, in an example, more than one set of thresholds M' and S' can be used for determining whether to increment P or not. For example, a first set of thresholds can be M'=5 and S'=40, and a second set of thresholds can be M'=10 and S'=30. The instruction fetch unit can increment the priority P by the credit C in response to the values of M and S being less than one of the sets of thresholds. For example, P can be incremented by C in response to either 1) M<5 and S<40, or 2) M<10 and S<30. Therefore, the values for M' and S' can be programmed such that threads with lower branch mispredictions, deeper speculation can be allowed, but threads with higher branch mispredictions may have to stop speculations earlier. By using the misprediction rates of threads to determine their priority, the number of wrong-path instructions in the processing pipeline 210 can be reduced. By using both the misprediction rates and speculative depth counts, the amount of wrongly speculated instructions resulting from wrongly speculated paths can be controlled and used for adjusting thread priorities to reduce the possibility of having wrongly speculated instructions occupying processor resources.

Figure 6:
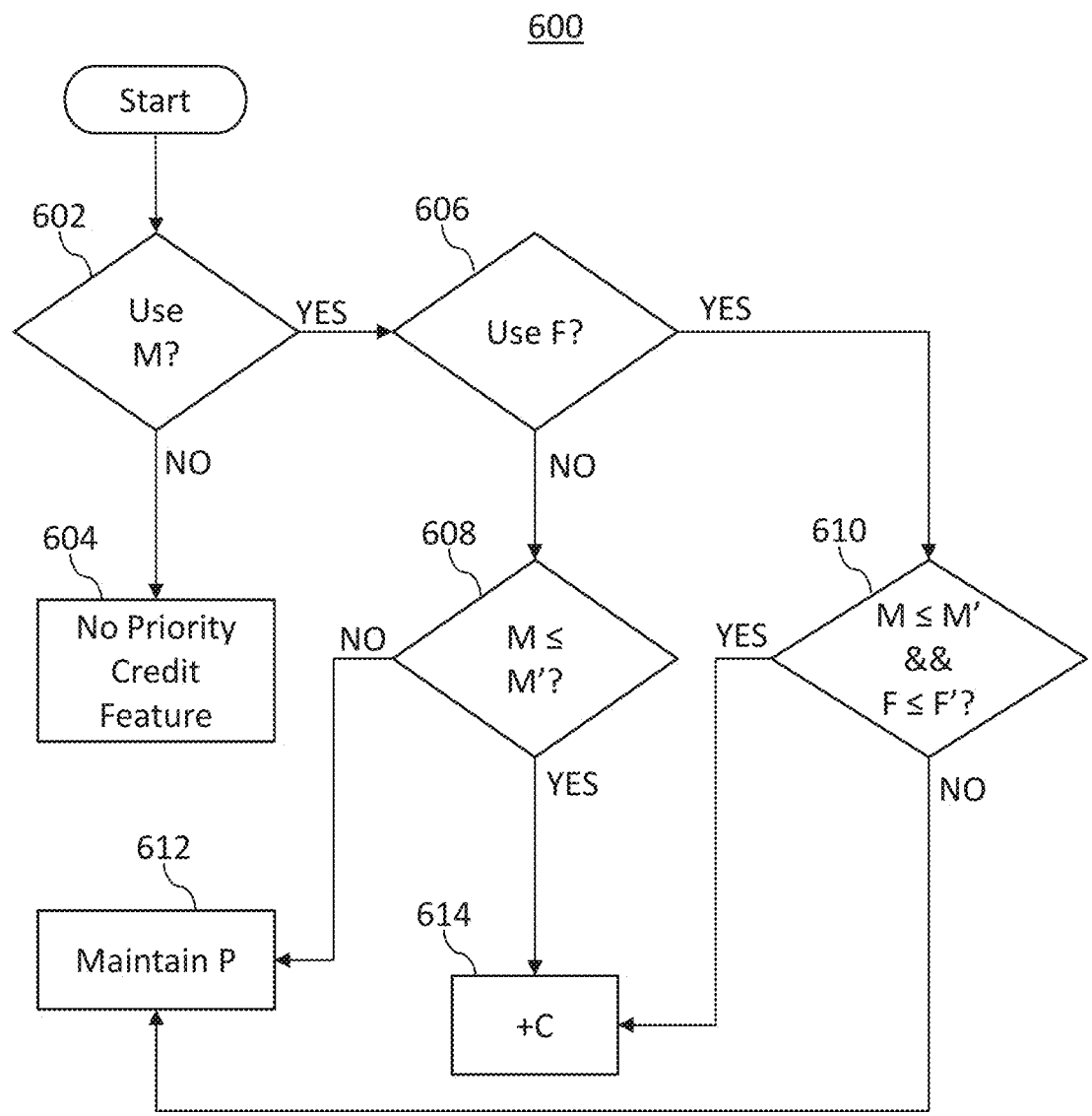
FIG. 6 illustrates an example flowchart example of determining thread priorities using misprediction rate and misprediction resolve time in an embodiment.

FIG. 6 illustrates an example flowchart example of determining thread priorities using misprediction rate and/or misprediction resolve time in an embodiment. The process 600 can include one or more operations, actions, or functions as illustrated by one or more of blocks 602, 604, 606, 608, 610, 612, and/or 614. Although illustrated as discrete blocks, various blocks can be divided into additional blocks, combined into fewer blocks, eliminated, or performed in parallel, depending on the desired implementation.

An example process 600 shown in FIG. 6 can be executed by the processor 102 to use the outputs from the misprediction counter 230, while monitoring a resolve time of a most recent misprediction of the processing pipeline 210, to adjust priorities of threads. The process 600 can begin at block 602, where the processor 102 can be programmed to either use a priority credit feature or not. The priority credit feature can be a feature for the instruction fetch unit 206 to adjust priorities of threads using the misprediction count, denoted as M in FIG. 6. The misprediction count M can be a count of mispredictions per a certain amount (e.g., one thousand, or other desired or determined number) of instructions. If the processor 102 is not programmed to use the priority credit feature, the process 600 can proceed to block 604. At block 604, the processor 102 can operate under its usual operation mode without the priority credit feature.

If the processor 102 is programmed to use the priority credit feature, the process 600 can proceed to block 606. At block 606, the processor 102 can activate the misprediction counter 230. The processor 102 can be further programmed to either use a resolve time of a most recent branch misprediction, denoted as F, in the processing pipeline 210, in addition to using M, or not to use F in addition to M (e.g., use M only). In an example, F can denote a resolve time that maybe required to resolve the most recent branch misprediction in the processing pipeline 210. If the processor 102 is not programmed to use F in addition to M, the process 600 can proceed to block 608.

At block 608, the processor 102 can determine a value of M for a thread, and can compare M to a misprediction threshold denoted as M' in FIG. 6. In response to M not being less than or equal to M' (or being greater than M'), the process 600 can proceed to block 612. At block 612, the priority, denoted as P, of the thread can be maintained. In response to M being less than or equal to M', the process 600 can proceed to block 614. At block 614, the processor 102 or the instruction fetch unit 206 can add a priority credit C to the priority P to increase a priority of the thread.

If the processor 102 is programmed to use F in addition to M, the process 600 can proceed to block 610. At block 610, the processor 102 can determine M for the thread, and also F of the thread. The processor 102 can compare M to M', and can compare F to a flush time threshold F'. The flush time threshold F' can be a flush time limit for the processing pipeline to flush instructions. In response to M not being less than or equal to M' (or being greater than M') and F not being less than or equal to F', the process 600 can proceed to block 612. In response to M being less than or equal to M' and F being less than or equal to F', the process 600 can proceed to block 614. By using both the misprediction rates and the resolve time to resolve the most recent branch misprediction, priority credits can be added to a priority of a thread that may have mispredicted branches resolved relatively quickly (e.g., before the processing pipeline flushes).

Figure 7:
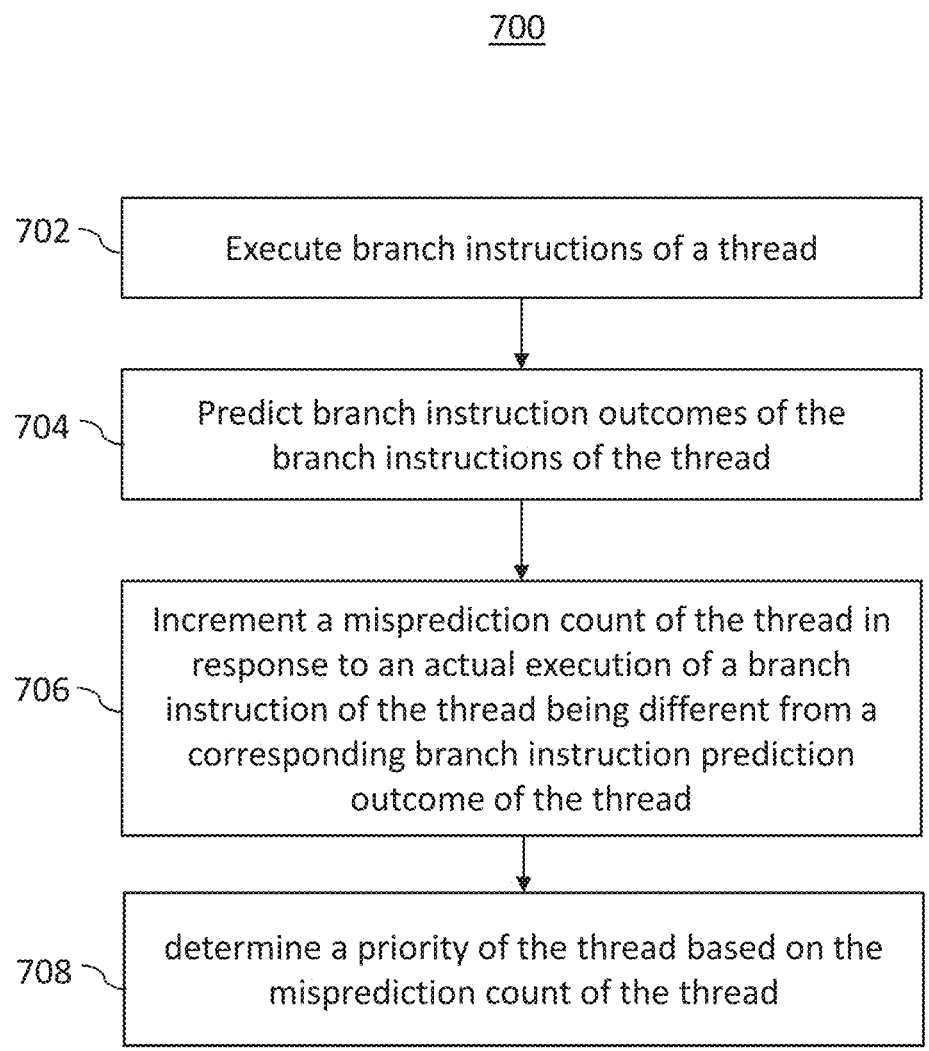
FIG. 7 illustrates an example flowchart describing a method for thread priorities using misprediction rate and speculative depth in an embodiment.

FIG. 7 illustrates an example flowchart describing a method for thread priorities using misprediction rate and speculative depth in an embodiment. The process 700 can include one or more operations, actions, or functions as illustrated by one or more of blocks 702, 704, 706, and/or 708. Although illustrated as discrete blocks, various blocks can be divided into additional blocks, combined into fewer blocks, eliminated, or performed in parallel, depending on the desired implementation.

The process 700 can begin at block 702. At block 702, a processor can execute branch instructions of a thread. The process 700 can proceed from block 702 to block 704. At block 704, the processor can predict branch instruction outcomes of the branch instructions of the thread. The process 700 can proceed from block 704 to block 706. At block 706, the processor can increment a misprediction count of the thread in response to an actual execution of a branch instruction of the thread being different from a corresponding branch instruction prediction outcome of the thread. The process 700 can proceed from block 706 to block 708. At block 708, the processor can determine a priority of the thread based on the misprediction count of the thread.

In an example, the processor can determine a misprediction rate of the thread using the misprediction count, and determine the priority of the thread based on the misprediction rate. The processor can compare the misprediction rate with a misprediction rate threshold. In response to the misprediction rate being greater than a misprediction rate threshold, the processor can maintain the priority of the thread. In response to the misprediction rate being less than the misprediction rate threshold, the processor can increment the priority of the thread by a predefined credit.

In an example, the processor can increment a speculative depth count of the thread in response to an occurrence of an unfinished branch instruction in the execution of the branch instructions of the thread. The processor can determine the priority of the thread using the speculative depth count. In another example, for each cycle subsequent to the unfinished branch instruction, the processor can compare the speculative depth count with a speculative depth threshold. In response to the misprediction rate being less than a misprediction rate threshold, and in response to the speculative depth count being less than the speculative depth threshold, the processor can increment the priority of the thread by a predefined credit until the speculative depth count is greater than the speculative depth threshold.

In an example, the processor can compare a resolve time of a most recent misprediction in the processor pipeline with a flush time threshold. The processor can, in response to the resolve time being less than the flush time threshold, increment the priority of the thread by a predefined credit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. It must also be noted that, as used in the specification and the appended claims, the singular forms "a", "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A processor comprising:
   a processor pipeline comprising one or more execution units configured to execute branch instructions of a thread;
   a branch predictor associated with the processor pipeline and configured to predict branch instruction outcomes of the branch instructions of the thread;
   a misprediction counter configured to increment a misprediction count of the thread in response to an actual execution of a branch instruction of the thread being different from a corresponding branch instruction prediction outcome of the thread;
   an instruction fetch unit configured to determine a priority of the thread based on the misprediction count of the thread; and
   a depth counter configured to increment a speculative depth count of the thread in response to an occurrence of an unfinished branch instruction in the execution of the branch instructions of the thread, wherein the instruction fetch unit is further configured to use the speculative depth count to determine the priority of the thread,
   wherein for each cycle subsequent to the unfinished branch instruction:
      the depth counter is configured to compare the speculative depth count with a speculative depth threshold; and
      the instruction fetch unit is configured to, in response to the speculative depth count being less than the speculative depth threshold, increment the priority of the thread by a predefined credit.

2. The processor of claim 1, wherein:
   the misprediction counter is configured to:
      determine a misprediction rate of the thread using the misprediction count;
      compare the misprediction rate with a misprediction rate threshold;
   the instruction fetch unit is configured to:
      in response to the misprediction rate being greater than the misprediction rate threshold, maintain the priority of the thread; and
      in response to the misprediction count being less than the misprediction rate threshold, increment the priority of the thread by a predefined credit.

3. The processor of claim 1, wherein the instruction fetch unit is configured to increment the priority of the thread by the predefined credit at each cycle subsequent to the unfinished branch instruction until the speculative depth count is greater than the speculative depth threshold.

4. The processor of claim 1, wherein the instruction fetch unit is configured to:
   compare a resolve time of a most recent misprediction in the processor pipeline with a flush time threshold; and
   in response to the resolve time being less than the flush time threshold, increment the priority of the thread by a predefined credit.

5. A computing system comprising:
   a memory; and
   a processor, wherein the processor comprises:
   a processor pipeline comprising one or more execution units configured to execute branch instructions of a thread;
   a branch predictor associated with the processor pipeline and configured to predict branch instruction outcomes of the branch instructions of the thread;
   a misprediction counter configured to increment a misprediction count of the thread in response to an actual execution of a branch instruction of the thread being different from a corresponding branch instruction prediction outcome of the thread;
   an instruction fetch unit configured to determine a priority of the thread based on the misprediction count of the thread; and
   a depth counter configured to increment a speculative depth count of the thread in response to an occurrence of an unfinished branch instruction in the execution of the branch instructions of the thread, wherein the instruction fetch unit is further configured to use the speculative depth count to determine the priority of the thread;
   wherein for each cycle subsequent to the unfinished branch instruction:
      the depth counter is configured to compare the speculative depth count with a speculative depth threshold; and
      the instruction fetch unit is configured to, in response to the speculative depth count being less than the speculative depth threshold, increment the priority of the thread by a predefined credit.

6. The computing system of claim 5, wherein:
   determine a misprediction rate of the thread using the misprediction count, wherein the misprediction rate indicates a number of misprediction counts per a predefined number of instructions of the thread being executed by the processor pipeline;
   the misprediction counter is configured to compare the misprediction rate with a misprediction rate threshold;
   the instruction fetch unit is configured to:
      in response to the misprediction rate being greater than the misprediction rate threshold, maintain the priority of the thread; and
      in response to the misprediction count being less than the misprediction rate threshold, increment the priority of the thread by a predefined credit.

7. The computing system of claim 5, wherein the instruction fetch unit is configured to increment the priority of the thread by the predefined credit at each cycle subsequent to the unfinished branch instruction until the speculative depth count is greater than the speculative depth threshold.

8. The computing system of claim 5, wherein the instruction fetch unit is configured to:
compare a resolve time of a most recent misprediction in the processor pipeline with a flush time threshold; and
in response to the resolve time being less than the flush time threshold, increment the priority of the thread by a predefined credit.

9. A method comprising:
executing, by a processor, branch instructions of a thread;
predicting, by the processor, branch instruction outcomes of the branch instructions of the thread;
incrementing, by the processor, a misprediction count of the thread in response to an actual execution of a branch instruction of the thread being different from a corresponding branch instruction prediction outcome of the thread;
determining, by the processor, a misprediction rate of the thread using the misprediction count, wherein the misprediction rate indicates a number of misprediction counts per a predefined number of instructions of the thread being executed by the processor; and
determining, by the processor, a priority of the thread based on the misprediction rate of the thread;
incrementing, by the processor, a speculative depth count of the thread in response to an occurrence of an unfinished branch instruction in the execution of the branch instructions of the thread; and
comparing, by the processor, the misprediction rate with a misprediction rate threshold;
comparing, by the processor, the speculative depth count with a speculative depth threshold; and
in response to the misprediction rate being less than the misprediction rate threshold, and in response to the speculative depth count being less than the speculative depth threshold, incrementing, by the processor, the priority of the thread by a predefined credit until the speculative depth count is greater than the speculative depth threshold.

10. The method of claim 9, further comprising:
in response to the misprediction rate being greater than a misprediction rate threshold, maintaining, by the processor, the priority of the thread.

11. The method of claim 9, further comprising:
comparing, by the processor, a resolve time of a most recent misprediction in the processor with a flush time threshold; and
in response to the resolve time being less than the flush time threshold, incrementing, by the processor, the priority of the thread by a predefined credit.

* * * * *